United States Patent [19]

Patenaude

[11] Patent Number: 4,539,174
[45] Date of Patent: Sep. 3, 1985

[54] FUEL PIN TRANSFER TOOL
[75] Inventor: Richard S. Patenaude, Old Saybrook, Conn.
[73] Assignee: Maine Yankee Atomic Power Company, Augusta, Me.
[21] Appl. No.: 427,621
[22] Filed: Sep. 29, 1982
[51] Int. Cl.³ .............................................. G21C 19/10
[52] U.S. Cl. .................................. 376/261; 376/271; 376/248; 376/251; 376/258; 294/906
[58] Field of Search ................. 376/260–271, 376/230, 251, 249, 258, 248; 294/86 A, 86.15, 86.28, 86.3, 86.32

[56] References Cited
U.S. PATENT DOCUMENTS

| | | | |
|---|---|---|---|
| 1,823,340 | 9/1931 | Vance | 294/86.15 |
| 2,301,377 | 11/1942 | Craig et al. | 294/86.3 |
| 2,508,285 | 5/1950 | Otis et al. | 294/86.3 X |
| 2,981,422 | 4/1961 | Bellinger et al. | 376/258 X |
| 3,199,906 | 8/1965 | Chenoweth | 294/86.15 |
| 3,628,822 | 12/1971 | Bostock | 294/86.28 X |
| 3,649,450 | 3/1972 | Barton | 376/258 |
| 3,905,634 | 9/1975 | Johnson et al. | 376/233 |
| 3,942,833 | 3/1976 | Plunk | 294/86.3 X |
| 3,990,942 | 11/1976 | Costes | 376/460 X |
| 4,053,355 | 10/1977 | Vuckovich | 376/258 |
| 4,064,451 | 12/1977 | Foxworthy | 376/258 X |
| 4,202,727 | 5/1980 | Batjukov et al. | 376/264 |
| 4,204,910 | 5/1980 | Koshkin et al. | 294/86 A X |
| 4,269,558 | 5/1981 | Coppa et al. | 376/261 X |
| 4,374,801 | 2/1983 | Albin | 376/264 |
| 4,385,028 | 5/1983 | Salamon | 376/264 |
| 4,399,603 | 8/1983 | Reed | 294/103 R X |
| 4,443,130 | 4/1984 | Hall | 294/86.15 X |
| 4,482,520 | 11/1984 | Randazza | 376/261 |

Primary Examiner—Deborah L. Kyle
Assistant Examiner—Dan Wasil

[57] ABSTRACT

A fuel pin transfer tool has a latching device of the collet type attached to a first member movable vertically through a long work stroke enabling a fuel pin in an under water assembly to be engaged and withdrawn therefrom or placed therein and released. The latching device has a collet provided with a plurality of resilient fingers having cam portions normally spaced apart to receive the upper end of a fuel pin between them and a second member, movable vertically through a short stroke relative to the first member is provided with cam portions engageable with those of the fingers and is yieldably and resiliently held in a raised position in which its cam portions engage those of the fingers and force the fingers into their pin-gripping positions. When a predetermined force is applied to the second member, it is so moved that its cam portions are disengaged from the cam portions of the fingers permitting the latter to move into their normal relationship in which a gripped pin is released or another pin received but with their pin-gripping relationship positively re-established and maintained once the force on the tubular member is lessened. Movement of the first member in either direction and movement of the second member into its raised position is attended by forces inadequate to affect the integrity of fuel pin cladding. That force is applied in the preferred embodiment, by a power operated actuator which is within the upper portion of a housing and, in the preferred embodiment, carried by the long stroke member but always in the upper housing portion which is of a material sufficiently translucent to enable the actuator to be observed throughout the work stroke and is sufficiently light in weight to prevent the tool from being top heavy.

16 Claims, 8 Drawing Figures

FUEL PIN TRANSFER TOOL

BACKGROUND REFERENCE

U.S. Pat. No. 3,905,634

RELATED APPLICATION

An application by John B. Randazza entitled "Fuel Pin Transfer Tool", Ser. No. 338,090, filed Jan. 8, 1982, assigned to the assignee of the present invention and now U.S. Pat. No. 4,482,520, dated Nov. 13, 1984.

BACKGROUND OF THE INVENTION

A fuel pin transfer tool must be capable of placing a fuel pin in an underwater assembly and of withdrawing such a pin therefrom in a manner enabling it to be examined, while under water, for clad defects. It is obviously a requirement that, in the use of such a tool, that a pin must not be released from the tool unless within an assembly or other place for safe storage.

While in the above referred-to copending application, means are provided to prevent the release of a fuel pin unless the pin is at least partially seated in an assembly, it is also necessary to provide a latching device which, independently of such means, provides for the holding of a fuel pin by the latching device on a basis more positive than in any prior proposed pin latching device.

THE PRESENT INVENTION

The objectives of the present invention are to provide improvements in fuel pin transfer tools.

A first major objective of the invention is to provide a latching device which is positively held against releasing a latched fuel pin with its inoperative or pin-releasing position established by a short downward thrust on an actuating member. According to this objective, a latching device has a collet provided with resilient fingers having normal pin-releasing or pin-receiving relationship and attached to the lower end of a long stroke member movable between a lower position in which a fuel pin may be received or seated in a fuel pin assembly and an upper position on which the fuel pin is held under water free of such an assembly and desirably within the tool. A short stroke member is movable axially relative to the collet fingers between a lowered position in which the fingers are free and a raised position in which the short stroke member encircles the fingers in a manner forcing them into their pin-gripping relationship. To that end, the short stroke member, the fingers or both have cam portions or surfaces. The short stroke member is held in its last referred-to position by resilient means until the actuating member is subjected to a force sufficient to overcome the resistance of the resilient means whether applied to the short stroke member, desirably by a power operated actuating device or by the long stroke when operated to pull a fuel pin from its assembly.

A related objective of the invention is to provide a latching device that is of a simple but rugged construction, an objective attained with the collet within a sleeve which includes the finger-encircling member with the collet fixed to the bottom end of the long stroke member and the sleeve also connected thereto but movable axially with respect to the collet and the long stroke member the distance wanted for the two positions of the finger-encircling member. Resilient means, preferably a series of Bellville washers or the equivalent are held captive within the sleeve and backed by the upper end of the collet.

Yet another related objective is to insure that a fuel pin gripped by the latching device will not adhere to one or more collet fingers when the fingers are released to return to their pin-releasing positions. This objective is attained by incorporating in the collet resilient means in a manner such that the resilient means become so tensioned by a fuel pin as it becomes seated within the fingers as to be operable to eject forcibly that pin once the resilient fingers are free to assume their pinreleasing relationship.

Yet another objective is to insure safe fuel pin seatings and withdrawals, an objective attained with a control of the long stroke member that permits its operation in either a running or jogging manner at controlled rates in either direction.

A second major objective of the invention is to improve the construction of fuel pin transfer tools of the type having a housing of such length that when suspended with its lower end in the water and close to and above the location of or for a fuel pin, the upper end portion of the housing is exposed above the water and of a length at least equal to the length of the long work stroke of the member carrying the latching device which member is of a length such that its upper end is always within the upper end of the tool.

In accordance with the present invention, the upper portion of the housing is of light weight material so that the actuator for the latching device may be attached to the upper end of the long stroke member without the tool being top heavy particularly when the actuator is in its uppermost position as it is whenever a fuel pin is withdrawn from an assembly. This enables the suspending means for the tool to be connected to the housing close to but below the light weight, upper end portion thereof.

A third objective of the invention is that of enabling the position of the latching device to be visually monitored, and is attained by constructing the light weight upper end portion of the tool of a material that is sufficiently translucent to enable the long stroke member to be observed so that, whether or not the long stroke member supports an actuating device for the latching device. The position of the long stroke member may be used to monitor the position of the latching device.

Other objectives of the invention and the manner in which they are attained will be apparent from the following specification and appended claims.

PRIOR ART STATEMENT

The only prior art known to me in connection with the present invention that is pertinent thereto is U.S. Pat. No. 3,905,634.

That patent disclosed two types of latching mechanisms for an element such as a control element. Each mechanism was operated to grip an element by tensioning a rod or cable by means of an actuator with the element released when the actuator was placed out of service.

One type of latching device utilized collet fingers within a tubular member having a cam shoulder. The upper end of the element had cam surfaces and the collet fingers had cam portions for coacting engagement with said surfaces and shoulders when the rod or cable was tensioned to raise the collet fingers a short distance but which were disengaged when the rod or cable was no longer tensioned, the collet fingers then becoming inoperatively positioned as the collet fingers were lowered by gravity.

BRIEF DESCRIPTION OF THE DRAWINGS

The accompanying drawings illustrate a preferred embodiment of the invention and—

THE PREFERRED EMBODIMENT OF THE INVENTION

The fuel pin transfer tool illustrated by the drawings is generally indicated at 10 and includes three tubular housing sections, an upper section 10A, a lower section 10B and a middle section 10C and joined to the sections 10A and 10B by detachable connections, generally indicated at 11.

Figure 1:
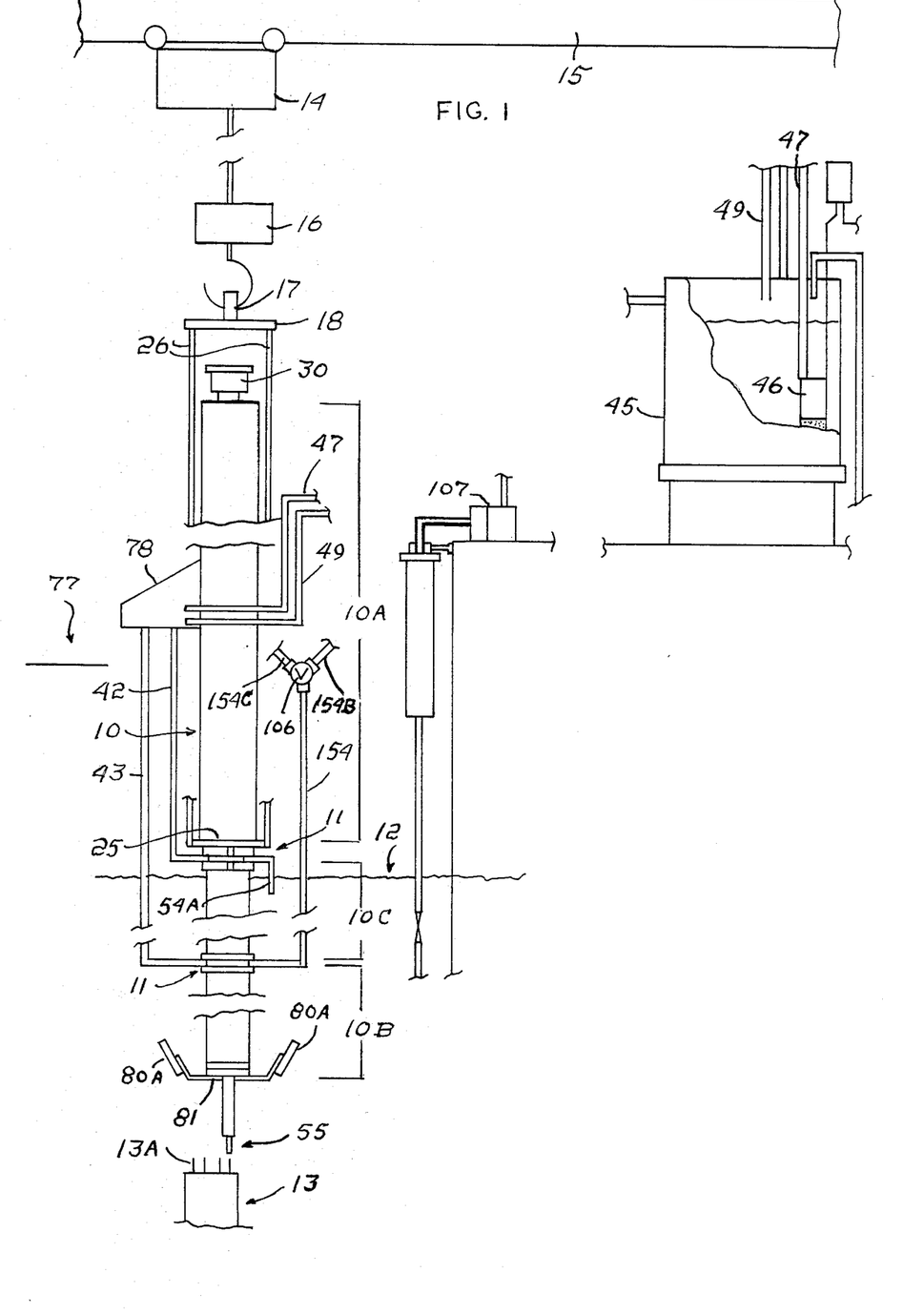
FIG. 1 is a somewhat schematic view illustrating a typical fuel pin transfer tool installation.

The length of the tool is such that it may be suspended with a substantial portion of its length, the section 10B and at least part of the section 10C extending downwardly in the pool of water in which a fuel pin assembly, generally indicated at 13, is located. As illustrative of means by which the tool may thus be suspended and located directly above a selected tool pin 13A, a conventional travelling hoist 14 is shown as carried by an overhead travelling beam 15 and having a powered lift 16 connected to an eye 17 centrally of a lifting plate 18.

Figure 4:
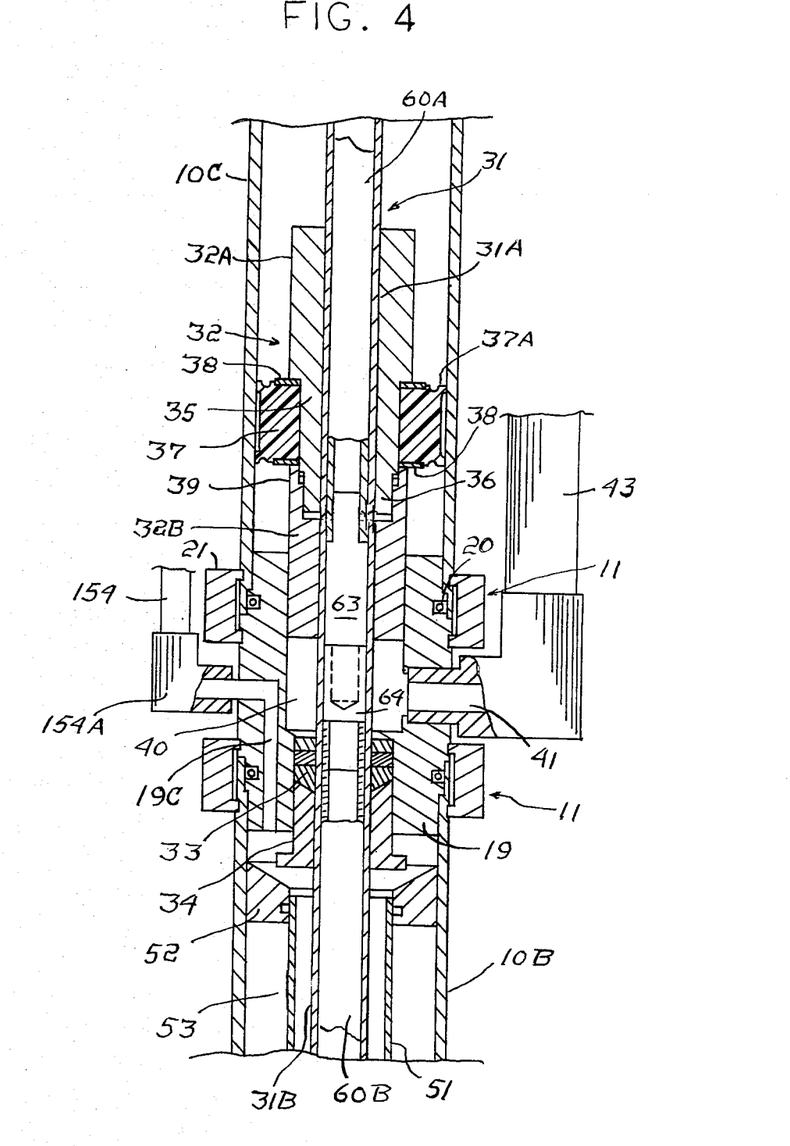
FIG. 4 is a view, similar to FIG. 3 but showing the piston assembly in the middle section and the junction therewith of the bottom section.

Each connection 11 includes an annular fitting 19 having shouldered end portions 19A and 19B each of which has an annular groove for a seal 20. Each end of the sections 10B and 10C, see FIG. 4, is dimensioned to receive within it the appropriate shouldered end to provide an end portion to fit over and compress the underlying seal 20. The proximate ends of the sections 10B and 10C are joined to the fitting 19 by detachable clamps 21 and provided with annular ribs 21A entrant of appropriately spaced annular grooves in the interconnected fitting and housing sections. The fuel pin transfer tool, as thus far described is substantially identical to that of the above referred-to copending application of John B. Randazza assigned to the assignee of the present invention.

The tubular housing section 10A is shown as of a translucent plastic such as "Plexiglass", a cast acrylic resin, a product of Rohm & Haas Co., and is of a diameter slightly greater than that of the sections 10B and 10C. The connection 11 between the sections 10A and 10C, see FIG. 3, requires that the section 10A be provided with an internal reinforcing metal ring 22 locked thereto as by cap screws 23 with the ring 22 carrying a seal 24. The ring 22 has an annular flange 22A the inside diameter of which is such as to receive within it the end portion 19A of the fitting 19 by which the housing sections 10A and 10C are to be joined together and also to overlie and compress the underlying seal 20. The outside diameter of the flange 22A is the same as the outside diameter of the housing sections 10B and 10C and is provided with an annular channel for the appropriate rib 21A of the upper clamp 21 by which the housing section 10A is connected to the fitting 19 of the connection between the housing sections 10A and 10C. The flange 21A also provides a shoulder which rests on a supporting ring 25 connected to the plate 18 by cables 26.

Figure 2:
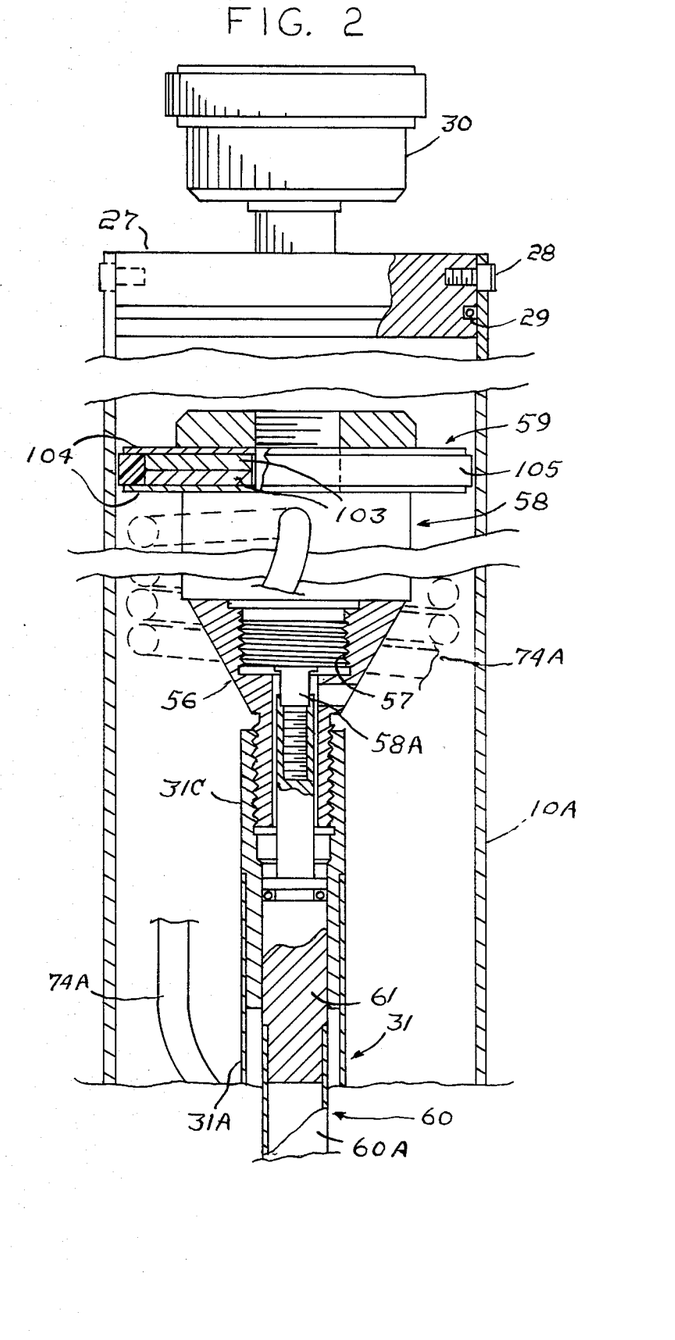
FIG. 2 is a fragmentary, lengthwise section of the upper end of the upper section of the tool.

The upper end of the housing section 10A is closed by an end cap 27, see FIG. 2, which fits therein and is secured thereto as by cap screws 28 and is provided with a seal 29. A filtered breather 30 attached to the end cap, opens through it into the section 10A.

Figure 3:
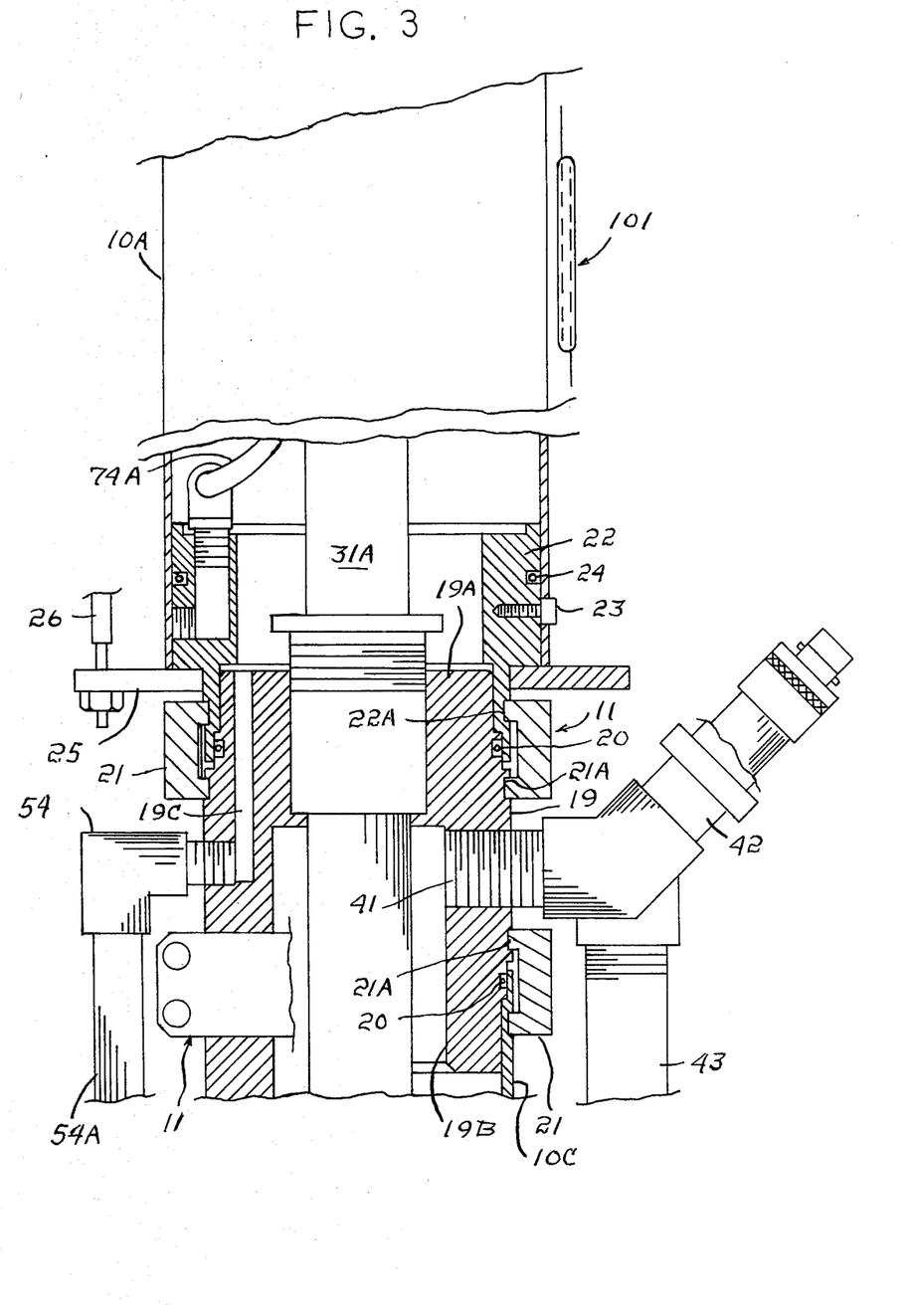
FIG. 3 is a like fragmentary view showing the junction between the upper and middle sections of the tool.

A tubular member, generally indicated at 31, consists of an upper section 31A extending from the upper section 10A into the housing section 10C, see FIGS. 3 and 4, where it is connected through a cylindrical coupling, generally indicated at 32, to a lower section 31B which extends from the housing section 10C into the housing section 10B. Each tubular section 31A, 31B extends through and is slidably sealed in the appropriate one of the fittings 19 the opposite ends of which have a recess for packing material 33 held suitably compressed by a gland 34.

The space between the fittings 19, substantially the entire length of the section 10C, thus constitutes a cylinder. The coupling 32 consists, see FIG. 4, of a first section 32A having a shoulder-establishing intermediate portion 35 of reduced diameter and an end 36 on which the second coupling section 32B is threaded. A piston 37 of slightly compressible material and formed with pressure deformable end lips 36A in engagement with the cylinder walls is confined between piston discs 38 on the intermediate portion 35 and the second section 32B has a nose 39 in engagement with the lower piston disc 38 thus enabling the degree of compression of the piston 36 to be adjusted essentially to lock the section 32A to the section 32B.

It will be noted that the exposed ends of the first and second sections of the coupling 32 extend the same distance from the piston 37 and both are of the same diameter. The proximate ends of the fittings 19 have cylindrical recesses 40, each dimensioned to receive an appropriate one of the coupling ends tightly so as to restrict the fluids exit but with the proximate one of the piston discs 38 engaging the facing fitting to prevent the received coupling end from so bottoming in its recess 40 that the port 41 opening therein through the side of the fitting 19 between the clamps 13 becomes totally blocked thus providing a dash pot effect at the ends of piston strokes.

Figure 7:
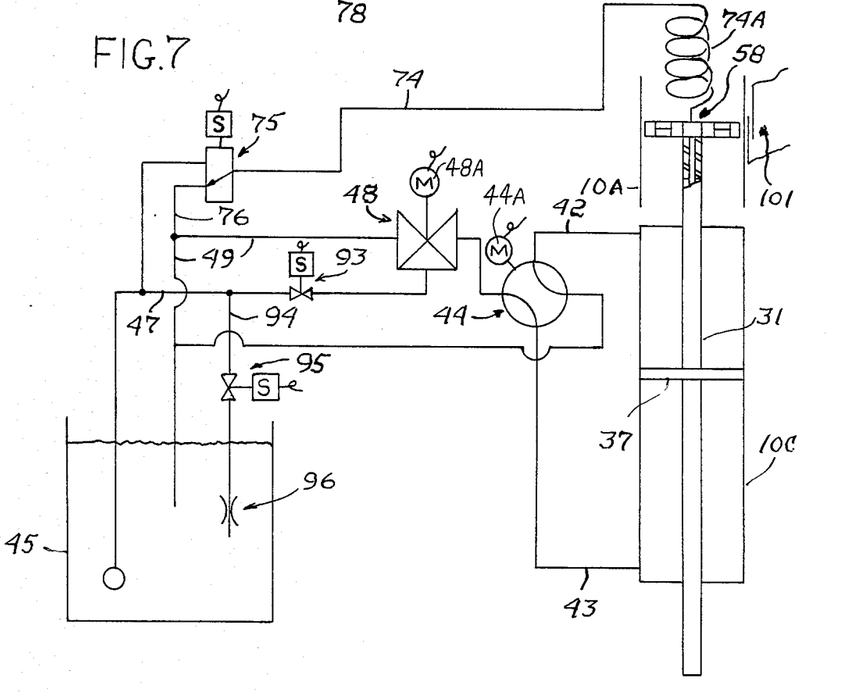
FIG. 7 is a schematic view of the systems by which fluid water pressure is employed to operate the actuator and to reciprocate the piston.
Figure 8:
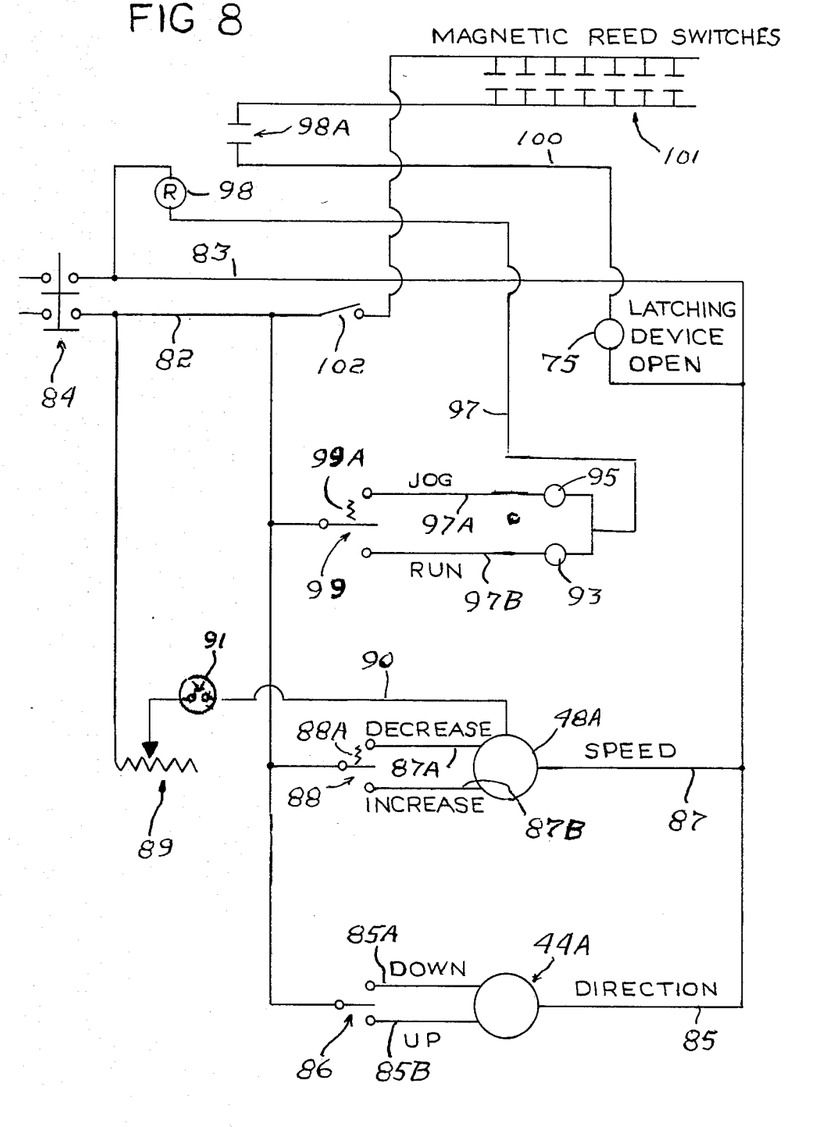
FIG. 8 is a schematic view of the circuitry.

The ports 41 are connected by upper and lower conduits 42 and 43, respectively, to a motorized four way valve 44, see FIGS. 7 and 8, to which water under pressure is delivered from a tank 45 by a submersible pump 46 through a conduit 47 having a motorized flow regulator valve 48 with the conduit 49 returning water from the valve to the pool 45. The piston 37 may thus be raised or lowered as required for the operation of the tool in a preferred manner subsequently to be detailed and depending on which conduit 42, 43 is established by the valve 44 as the delivery conduit with the other conduit then serving to return the water to the tank 45.

The lower end of the section 10B has an annular groove as does the exposed portion of an end cap 50 thus enabling the end cap to be detachably secured to the section 10B by a clamp 11.

A guide tube 51 through which the tubular member 31 freely extends has its upper end held by and sealed to a spacer 52 adjacent the upper end of the section 10B and connected thereto. The guide tube 51 is also held by and sealed to the end cap 50 through which it freely extends and thereby establishes an annular chamber 53 having a drain port through the end cap 50 normally closed by a plug 53A. The end cap 50 has a threaded counterbore 50A in which is threaded a thick walled guide tube extension 51A which is shown as locked in position by a set screw 51B. Uses of the annular chamber 53 will be apparent from the description of the operation of the tool.

The fitting 19 of the connection between the housing sections 10A and 10C, see FIG. 3, has a drain port 19C opening through the side wall thereof, and connected by a fitting 54 to a drain conduit 54A. The fitting 19 of the connection between the housing sections 10C and 10B, see FIG. 4, has a like port 19C opening into the annular chamber 53 and connected to a conduit 154 through a fitting 154A. The conduit 154 extends upwardly out of the water and its functions will also be detailed in connection with the operation of the tool.

As the length of the housing section 10C is substantial, about thirteen feet, by way of example, and not of limitation, the reciprocation of the piston 37 between its maximum upper and lower positions within the cylinder, the section 10C provides a long work stroke for the tubular member 31. The length of the housing section 10A and of the section 31A of the tubular piston member are such that the upper end of the section 31A is always within the section 10A and the length of the housing section 10B and of the section 31B of the tubular piston member 31B is such that its lower end is within that section when the piston 37 is in its uppermost position and protrudes from that section and the guide tube extension 51A when the piston is in its lowermost position.

A fuel pin latching device, generally indicated at 55 is attached to the lower end of the section 30B of the piston member but before detailing the construction thereof, the means for operating it will be described.

The upper end of the section 31A, see FIG. 2, is provided with a thick walled tubular extension 31C which is internally threaded to enable a mount 56 to be attached thereto and the mount 56 has a threaded socket 57 enabling a fluid pressure operated actuating device 58 to be attached to the tubular piston member and to travel therewith as the piston 37 is reciprocated. The device 58 has a guide 59 attached to its upper end and dimensioned to be a sliding fit in the housing section 10A and as that section 10A is of a translucent plastic and is above water, the position of the guide 59 is always visible. The section 10A may be marked with graduations enabling the position of the latching device 55 to be accurately monitored as the piston 37 is raised or lowered. The guide 59 is further detailed and described in connection with the operation of the tool.

The actuating device 58 is desirably and as shown, of a conventional type that is hydraulically operated to impart a short, downward stroke to a rod 58A with the rod 58A returned to an upper, retracted position when the device 58 is relieved of operating pressure.

The rod 58A is connected to an actuating member, generally indicated at 60 and shown as consisting of two sections 60A and 60B which, in practice, are both tubular and provided with end inserts. In the case of the section 60A, see FIG. 2, an upper end insert 61 is threaded on the rod 58A and in the case of the section 60B, see FIG. 5, a lower end insert is an end cap 62. The proximate ends of the actuator sections, see FIG. 4 have inserts 63 and 64 located below the cylindrical piston member 32 and are there threaded together.

Figure 5:
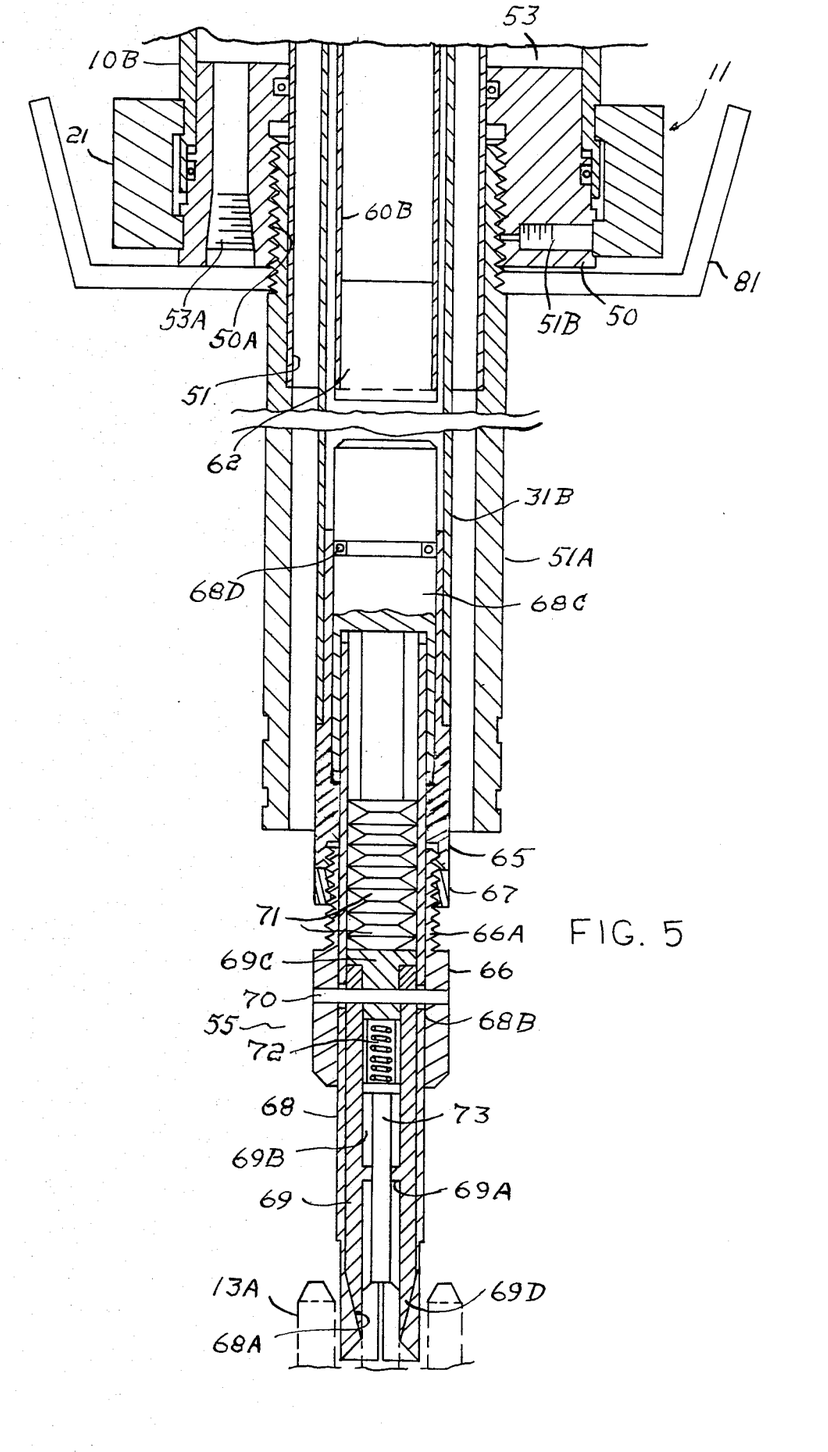
FIG. 5 is a like section of the bottom end of the tool.
Figure 6:
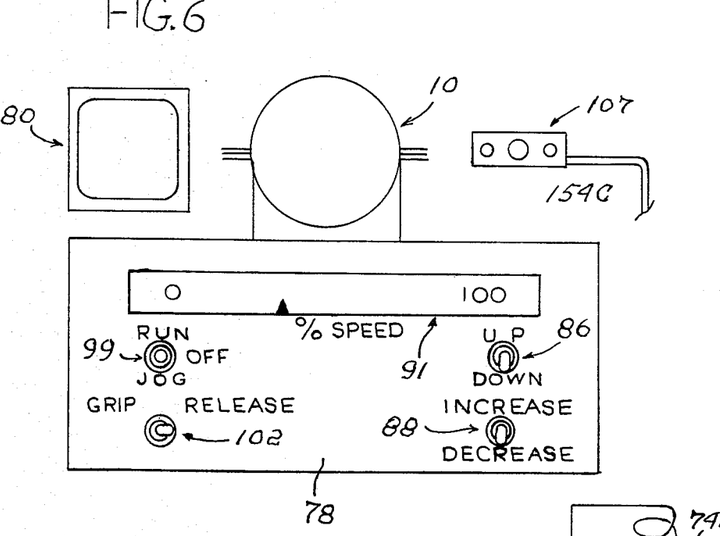
FIG. 6 is a somewhat schematic view of a tool control panel.

The section 31B of the tubular piston member includes a bottom end fitting 63, see FIG. 5, which is internally threaded to receive the shank 66A of the holder 66 with the adjusted position thereof maintained as by means of a lock ring 67.

The holder 66 has a bore extending from end-to-end thereof which freely receives a sleeve 68 of a length such that it protrudes from both ends of the holder. The sleeve 68 freely receives a collet 69 which has a central partition 69A, a rearwardly opening chamber 69B closed by a plug 69C and three resilient fingers 69D which are normally spaced apart to establish their fuel pin receiving or releasing relationship. The outer surfaces of the fingers 69D taper inwardly towards each other to provide cam surfaces or portions while the exposed end of the sleeve 68 is internally tapered as at 68A in a manner such as to establish a cam surface or portion which normally encircles the fingers 69D and cams then inwardly into their fuel pin gripping positions.

An anchor pin 70 extends transversely through the holder 66, the plugged end of the chamber 69B, and through short lengthwise slots 68B in the sleeve 68. The collet 69 is thus securely held against movement relative to the holder 66, and accordingly, while the sleeve 68 is free to move axially relative thereto between two positions in the first or upper one of which, the fingers 69D are held in their pin-gripping position and in the second or lower position, the sleeve 68 has been moved to an extent leaving the fingers 69D free to move outwardly to establish the pin-releasing, pin-receiving positions thereof.

A series of Bellville washers 71 are housed within the sleeve 68 and are backed by the end plug 69C of the collet and confined by the end cap 68C secured to the upper end of the sleeve and carrying a seal 68D in engagement with the fitting 65. When hydraulic pressure is applied to the device 58, the actuating member 60 is driven downwardly to an extent such that its end cap 62 engages the end cap 68C with sufficient force to overcome the yieldable but very substantial resistance afforded by the series of Bellville washers 71 and then to so move the sleeve 68 downwardly the short distance required to free the resilient fingers 69D to return to their normal relationship thus releasing a gripped fuel pin or permitting a fuel pin 13A to be received between them by then lowering the piston 37 and accordingly, the latching device 55 to an appropriate extent.

The collet chamber 69B houses a coil spring 72 confined between the end plug 69C the head of an ejector pin 73 extending through the partition 69A and of a length such that it is engaged by the head of a fuel pin 13A as the latching device 55 is advanced to receive it with the fingers 69D then in their open, pin-receiving relationship. The spring 72 becomes compressed as the head of a fuel pin 13A enters within the fingers 69D to an extent ensuring that when a latched fuel pin 13A is to be later released, it will then be forced from between the fingers 69D to ensure against the possibility of its adhering to one or more of them.

It is preferred, as stated, that the actuating device 58 be fluid pressure operated and to that end, see FIG. 7, a solenoid valve 75 and the actuating device 58. A return conduit 76 from the valve 75 is connected to the return conduit 49 leading from the valve 48.

The portion 74A of the conduit 74 within the housing section 10A is flexible and when the piston 37 is in its uppermost position, the conduit portion 74A is loosely stretched in the manner indicated by solid lines in FIG. 2. As the piston 37 is shown in FIG. 4 nearly in its lowermost position, the conduit portion 74A is shown by broken lines as having been nearly compressed. When the piston 37 is again returned to its uppermost position, the conduit portion 74A is pulled and nearly straightened, see FIGS. 2 and 3.

It is apparent from the foregoing that the tool as thus far described, once positioned in vertical alighment with a selected one of the fuel pins 13A and lowered in the water until the latching device 55 is close to that pin, the tool may be operated to effect the pin-receiving position of the fingers 69D of the latching device by operating the actuating device 58 to overcome the resistance of the Belleville spring washers 71, the piston 37 then lowered to an extent positioning the fuel pin within the latching device, relieving the actuating device of operating pressure with the fuel pin then tightly gripped by the latching device and finally the piston moved to withdraw the gripped fuel pin from the assembly or the tool may be operated in the reverse mode to seat the gripped pin within an assembly 13.

Such operations are controlled from an operator's station 77 above the pool 12, see FIG. 1, where there is a control panel 78. As taught in the above referred-to application, a television camera or cameras are used with a screen 80 located near the control panel 78 and the cameras mounted on a holder 81 bolted to end cap 50. By such means, not only can a fuel pin be visually inspected as it is being withdrawn from an assembly but also the pin may be observed during latching operations and the assembly and the fuel pin observed when the fuel pin is being returned thereto.

Reference is now also made to FIGS. 7 and 8 in which the hydraulic system and the electrical circuitry, respectively, are schematically illustrated.

Leads 82 and 83 from a suitable 115 VAC source under the control of a switch 84 have connected thereto in parallel the motorized valve 44 by which the direction of travel of the piston 37 and accordingly that of the latching device 55 is controlled and the motorized valve 48 by which their rate of travel is controlled.

In the case of the motorized valve 44, its motor 44A is connected to the lead 83 by a lead 85 and to the lead 82 by parallel leads 85A and 85B which are controlled by a switch 86 on the operator's panel 78. The switch 86 is operable to close either the lead 85A by which the valve 44 is so positioned that the piston 37 is driven downwardly or the lead 85B, the valve 44 then positioned to cause the piston to be driven upwardly.

The motor 48A of the valve 48 is connected to the lead 83 by a lead 87 and to the lead 82 by parallel leads 87A and 87B controlled by a switch 88 located on the panel 78. Like the switch 86, the switch 88 is movable into positions in which either the lead 87A or the lead 87B is closed, the former then operable to so affect the motor 48A of the valve 48 as to decrease the rate of travel of the latching device 55 and the closing of the latter lead resulting in an increase in the rate of travel. The switch 88 differs from the switch 86 in that, in closing the leads 87A or 87B it must be manually held closed against the opposition of a spring 88A.

In the disclosed embodiment of the invention the selected rate of travel is indicated by a voltmeter 91 as biased by potentiometer 89 in lead 90. Voltmeter 91 is located on the panel 78 and provides information to the operator of the rate of travel of the piston and, accordingly, the latching device that has resulted from adjustments of the regulating valve 48 by means of the panel switch 88.

The pump controlled delivery conduit 47 to the motorized valve 48 includes a normally closed solenoid valve 93 between which and the junction of the conduits 47 and 74 there is a conduit 94 by which water is discharged back into the tank 45 and which includes a normally open solenoid valve 95 and an orifice 96. This arrangement ensures that either a full pump head is continuously available in the conduits 47 and 74 when the valve 93 is open and the valve 95 closed or a predetermined back pressure is continuously available in those conduits established by the orifice 96 when the valve 93 is closed and the valve 95 is open, providing the pressure wanted for the operation of the actuating device 58.

The solenoid valves 93 and 95 are in a lead 97 connected to the lead 83 through a relay 98 and to the lead 82 by parallel leads 97A and 97B which are under the control of a switch 99 located on the panel 78. The switch 99 is like the switch 88 in that it is positionable to close either of the leads 97A and 97B. When positioned to close the lead 97A, it must be held against the opposition of a spring 99A. In normal operation the lead 97B is closed to provide running travel of the latching device 55 but when short or "jogging" movements or forces are to be applied to the latching device 55, the operator operates the switch 99 to momentarily close the lead 97A and operates the switch 88 to momentarily close the lead 87A to adjust the valve 48 to reduce the flow therethrough to the valve 44 and, accordingly, the rate of travel of the latching device with its wanted short movements then smoothly effected.

It will be appreciated that an essential feature of tools in accordance with the invention is that compression and tension forces applied to a fuel pin while being withdrawn from or seated in an assembly are limited to ensure that the integrity of the cladding of the fuel pins is not endangered. To that end, the preload established by the Belleville spring washers is adjusted so that the pin pull out force is limited, in present practice to 50 pounds but in any case below the cladding pull apart force. If the upward pull on a gripped fuel pin exceeds the gripping force established by the Belleville spring washers the latching device 55 will not move. In addition, the pump head capacity and losses in the conduits govern the input force on the piston 37 which, less friction losses, are factors considered in determining the maximum compression and tensioning forces on the fuel pins. While the output of the pump 46 and accordingly the maximum rate of travel of the latching device 55 depends on its size, that rate must be low, three-quarters of a foot per second by way of illustration and not of limitation.

As it is impermissable that the latching device 55 be operated to release a gripped fuel pin 13A except when it is at least partially seated in a place of safe storage, the solenoid valve 75 is connected to the leads 82 and 83 by a lead 100 which also inlcudes the normally open switch 98A of the relay 98, a group of parallel circuit magnetic reed switches 101, and a manually operated control switch 102 located on the panel 78.

Reference is again made to FIG. 2 where the guide 59 is shown as having a plurality of disc-like ceramic magnets 103, plated steel pole pieces 104 in contact therewith, and a guide ring 105 of Nylon, for one example. The reed switches 101 are arranged and attached to the exterior of the housing section 10A such as to provide a permissive band where the latching device 55 may be operated to release a gripped fuel pin. The band is near the lower end of piston travel, see FIG. 3, in which position a fuel pin is essentially entered in a safe place of storage.

It will thus be seen that with the above described hydraulic system and circuitry, the operator, with the television screen permitting observation of the relation of the latching device to a selected fuel pin 13A or the relation of a gripped fuel pin to an assembly 13, can advance the latching device accurately, by jogging it in a controlled manner, if need be until in a position to grip a fuel pin.

Regardless of when the switch 102 is closed, the latching device 55 cannot release its grip until one of the reed switches 101 closes. With the latching device 55 in a position to grip the selected fuel pin, the switch 102 is operated and the switch 86 then set to close the lead 85B thus to cause upward travel of the piston 37 once the switch 99 is set to cause piston travel. Often the switch 99 will be set to close the lead 97A to enable the operator to use it as a push button or jogging control in releasing the fuel pin from the assembly or in returning the fuel pin thereto.

During the withdrawal of the fuel pin, it can be carefully inspected by means of the television cameras 80 A for cladding defects. While the fuel pin is held within the guide tube 51, the annular space 10 between the guide tube 51 and the section 31B of the tubular member 31 may be used to adjust the heat escaping the fuel pin, thus its temperature and internal gas pressure by filling the annular space XX with a fluid of greater or lesser heat transfer characteristics such as water or air thus to control the gross temperature of that fuel pin. For that purpose the conduit 154 may be used for the delivery of the fluid via a branch 154B, see FIG. 1, on the appropriate setting of the valve 106. A branch 154C is shown as connectable by the appropriate setting of the valve 106 to a gas analysis instrument 107 located near the operator's station 78 enabling any gaseous materials escaping from a fuel pin housed in the guide tube 51 to be analyzed during such a test.

When the inspected fuel pin is again to be placed in storage, the operator sets the switches 86 and 99 to effect downward travel of the latching device 55. Usually, the switch 99 is set to cause continuous or running travel of the latching device with the switch 88 operated to temporarily decrease or restore the rate of travel thereof and typically with the fuel pin jogged until fully deposited where wanted, usually in the assembly from which it was withdrawn. Once it is observed that the fuel pin is at least partially reseated, the switch 102 is operated to effect the pin-releasing position of the collet fingers 69D but if the switch 102 is so set earlier, no premature release can occur due to the magnetic reed switch 101.

When the fuel pin is pushed into its fully seated position in an assembly, the latching device 55 is retracted usually only until it is raised clear of the assembly and it will be noted that the spring 72 within the collet 69 and acting against the ejector pin 73 ensures that the pin 13 cannot remain stuck in the collet as it is now being raised.

In practice and as disclosed in the above referred-to application, water may be and desirably is withdrawn as needed, from the pool 12 by means of a pump 109 in a conventional manner.

Fuel pins are of two general types, one type has its head end formed to facilitate its being externally gripped and securely held while the other type has a socket in its head end formed to enable it to receive and be freely gripped and held by laterally expanding latching fingers. The latching device of the present invention is adapted for safe use with either type of fuel pin if of the same diameters.

I claim:

1. A fuel pin transfer tool for use in withdrawing a fuel pin from or placing a fuel pin in a fuel pin assembly submerged in water in a tank, said tool including a tubular housing of such length that it may be suspended by means located above the water with a portion of the housing extending downwardly in the water in vertical alignment with and spaced a predetermined distance above a selected one of the fuel pins of the assembly or the location therein for a fuel pin, a first rigid axially movable means within the housing, an axial latching device connected to the lower end of said means including a collet member provided with a plurality of resilient fingers normally spaced apart for the free reception of the head end of a fuel pin, a sleeve member surrounding said fingers, one of said members connected to said axially movable means and the other member movable axially relative to said one member between upper and lower positions, said fingers and said sleeve member including surfaces that are mutually engageable and shaped to cam said fingers into a relationship for gripping the received end of a fuel pin when said axially movable member is in one of said positions, said fingers in their pin-receiving relationship when said axially movable member is in the other of said positions, axially located, resiliently compressible means having upper and lower ends, backing means above said fingers connected to said axially movable means and backing said lower end, said other member connected to said backing means in a manner establishing the upper and lower positions thereof, a connection between the upper end of said resilient means and said other member, said other member in the upper position thereof holding said resilient means under compression against downward movement unless a predetermined downward force is exerted against the connection capable of overcoming the resistance of said resilient means and to move said other member into the lower position thereof whereby said resilient means normally prevent axial movement of said other member, first operator controlled means operable to reciprocate said first axially movable means between upper and lower positions spaced apart a distance such that a stroke is provided of a length such that said latching device may be advanced into a position below the lower end of the housing in which a fuel pin is either to be released in or withdrawn from the assembly and a withdrawn pin at least partly received within the housing, second rigid axially movable means above said connection and a second operator control operable to drive said second axially movable means downwardly into such engagement with said connection as to exert said predetermined downward force thus to so move said other member as to enable said fingers to return to their normal relationship.

2. The fuel pin transfer tool of claim 1 in which the member that is axially movable relative to the other is the sleeve member and the first position thereof is its upper position.

3. The fuel pin transfer tool of claim 1 in which the collet member includes resilient means exposed to be engaged and tensioned by the head end of a fuel pin when entered therein then to be operable to exert a force thereon such that should a fuel pin adhere to any one of the fingers when in their pin-releasing relationship, that fuel pin would be freed therefrom.

4. The fuel pin transfer tool of claim 2 in which a pin extends transversely through the collet member, the sleeve member and the lower end of the first axially movable means, the sleeve member has lengthwise slots through which the pin extends and which are dimensioned to enable the sleeve member to move axially a short distance relative to the collet member, the sleeve member extends upwardly beyond the upper end of the collet member, the connection includes a cap closing the upper end of the sleeve member and is secured thereto, and the resilient means is confined within the sleeve member between the upper end of the backing means and the cap.

5. The fuel pin transfer tool of claim 4 in which the resilient means is a series of Bellville spring washers.

6. The fuel pin transfer tool of claim 4 in which the collet member has a central partition and an upper and closed chamber and a downwardly opening chamber, a spring housed in the upper chamber, an ejector is slidably held by the partition and includes a head within the upper chamber and engaged by the spring, the ejector is exposed in the lower chamber to be engaged by the head end of a fuel pin as it enters the collet member then to so tension the spring when the fuel pin is in a position to be held that the spring is operable to exert an ejecting force on the fuel pin when the fingers are in their pin-releasing relationship.

7. The fuel pin transfer tool of claim 1 in which a minor portion of the housing is exposed above the water, the second operator controlled means includes a power operated device fixed in the upper end of the second axially movable means and is provided with a guide slidably fitting the minor portion of the housing, the length of the minor portion is such as to accommodate the power operated device and the guide throughout the stroke of the second axially movable means, the minor portion of a material sufficiently light in weight as compared to the weight of the material of the remainder of the housing that the center of gravity of the tool is below the minor portion and said housing including means below but adjacent the lower end of the minor portion attachable to the suspending means.

8. The fuel pin transfer tool of claim 7 in which the minor portion is of a plastic sufficiently translucent to enable the position of the guide to be seen throughout the stroke and the position of the latching device relative to the assembly thereby determined.

9. The fuel pin transfer tool of claim 1 in which the first operator controlled means is of a fluid pressure operated type including a pump and a flow regulating valve operable to establish an operating pressure such that the force exerted on the first axially movable means is adequate to withdraw a fuel pin from the assembly but insufficient to destroy the integrity of the cladding of a fuel pin stuck in the assembly, and said first operator controlled means including a manually operable control to enable the axially movable means to be subjected to a different pressure in either direction for freeing the fuel pin from the assembly or to effect the seating of a fuel pin therein.

10. The fuel pin transfer tool of claim 9 in which the different pressure is greater and is employed in freeing a fuel pin.

11. The fuel pin transfer tool of claim 1 in which the first operator controlled means is of a hydraulic type and includes a tank for a volume of water, delivery and return conduits, said delivery conduit includes a pump and a flow regulating valve, a valve in control of said conduits and provided with connections with the interior of the housing to provide the upper and lower limits of the stroke, and operable to place either conduit in communication with either connection and the other conduit thereby to control the direction of the travel of the first axially movable means, said flow regulating valve establishing a predetermined maximum rate of travel of the latching device and an operating pressure such that the maximum force that can be exerted by the axially movable means on a gripped fuel pin within an assembly is less than that which would endanger the integrity of the cladding thereof, and the flow regulating valve is of a type provided with a reversible motor operable to vary the flow rate to vary the rate of travel of the latching device in either direction to establish rates therefor less than the predetermined maximum rate and an operator control for said motor.

12. The fuel pin transfer tool of claim 11 in which the delivery conduit is provided with a normally open valve between the tank and the flow control valve and a second return conduit in connection with the delivery conduit between the tank and the normally open valve, and the second return conduit is provided with a normally open valve and a flow restricting orifice, the second operator controlled means has a hydraulically operated device, delivery and return conduits in communication with the tank water, a two position valve provided with a connection with the device with one position the normal position and placing the connection in communication with the return conduit and the other position placing the delivery conduit in communication with the device, and an electric control circuit has a rate control lead provided with a manually operated switch having an open position and two closed positions and the reversible motor by which the flow control valve is operated, and a parallel lead provided with parallel solenoids, one operable to close the normally open valve and the other operable to open the normally closed valve, and a switch having an open position and positions in which either of said solenoids is energized, said switch yieldably held open with respect to the normally open valve thereby to establish an operating pressure for the hydraulically operated device when the normally closed valve remains closed determined by the orifice.

13. The fuel pin transfer tool of claim 12 in which the control circuit has an additional parallel lead including a manually operated on-off switch, a solenoid operable to position the valve in control of the hydraulically operated device in the other position thereof and normally open switch means closed automatically only when the axially movable means has advanced the latching device to a position in which a gripped fuel pin would be at least partly seated in the assembly.

14. The fuel pin transfer tool of claim 13 in which the circuit includes means operable to hold said additional lead open unless the circuit is closed with respect to the other switches.

15. The fuel pin transfer tool of claim 12 in which the circuitry includes a lead to the motor of the flow control valve which includes a potentiometer and a voltmeter, the voltmeter providing the operator with a measure of the rate of travel of the latching device.

16. The fuel pin transfer tool of claim 9 in which the control is yieldably held in a position in which said different pressure is established.

* * * * *